Dec. 18, 1951  R. H. HELLWIG  2,578,702
SPRING STABILIZER ATTACHMENT
Filed March 15, 1948  3 Sheets-Sheet 1
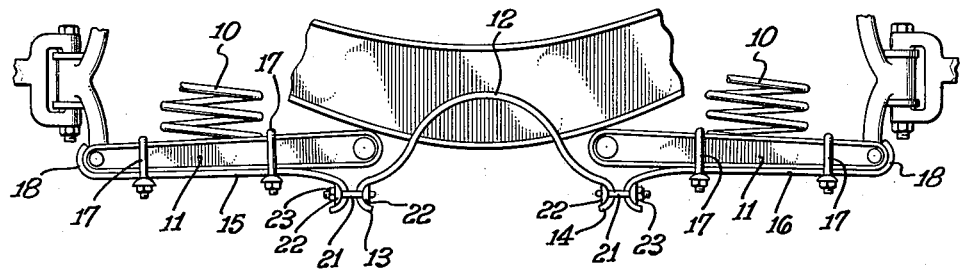
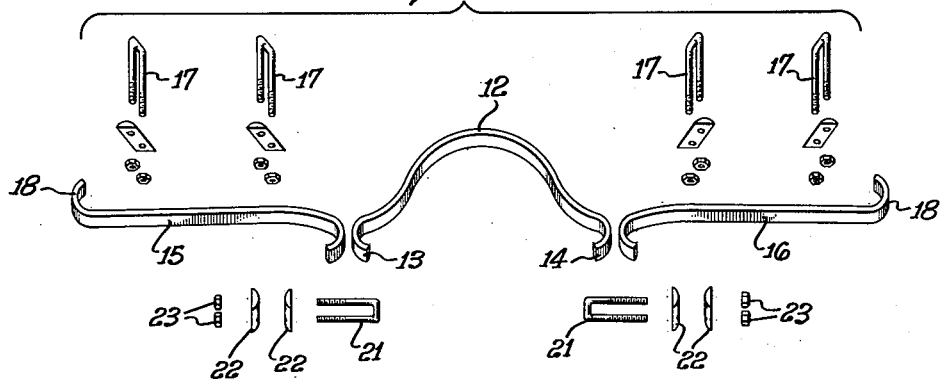
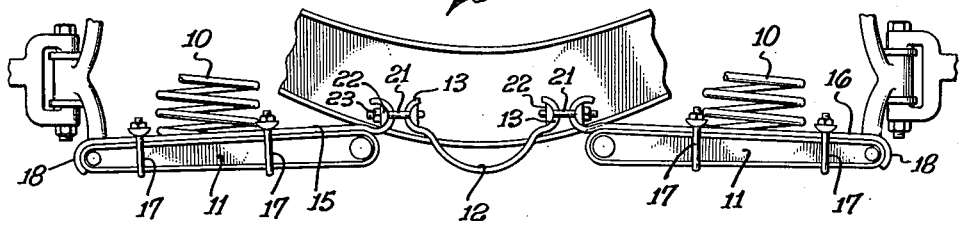
RUDOLPH H. HELLWIG,
INVENTOR.
BY
ATTORNEY.

Dec. 18, 1951  R. H. HELLWIG  2,578,702
SPRING STABILIZER ATTACHMENT
Filed March 15, 1948  3 Sheets-Sheet 2

RUDOLPH H. HELLWIG,
INVENTOR.

BY

ATTORNEY.

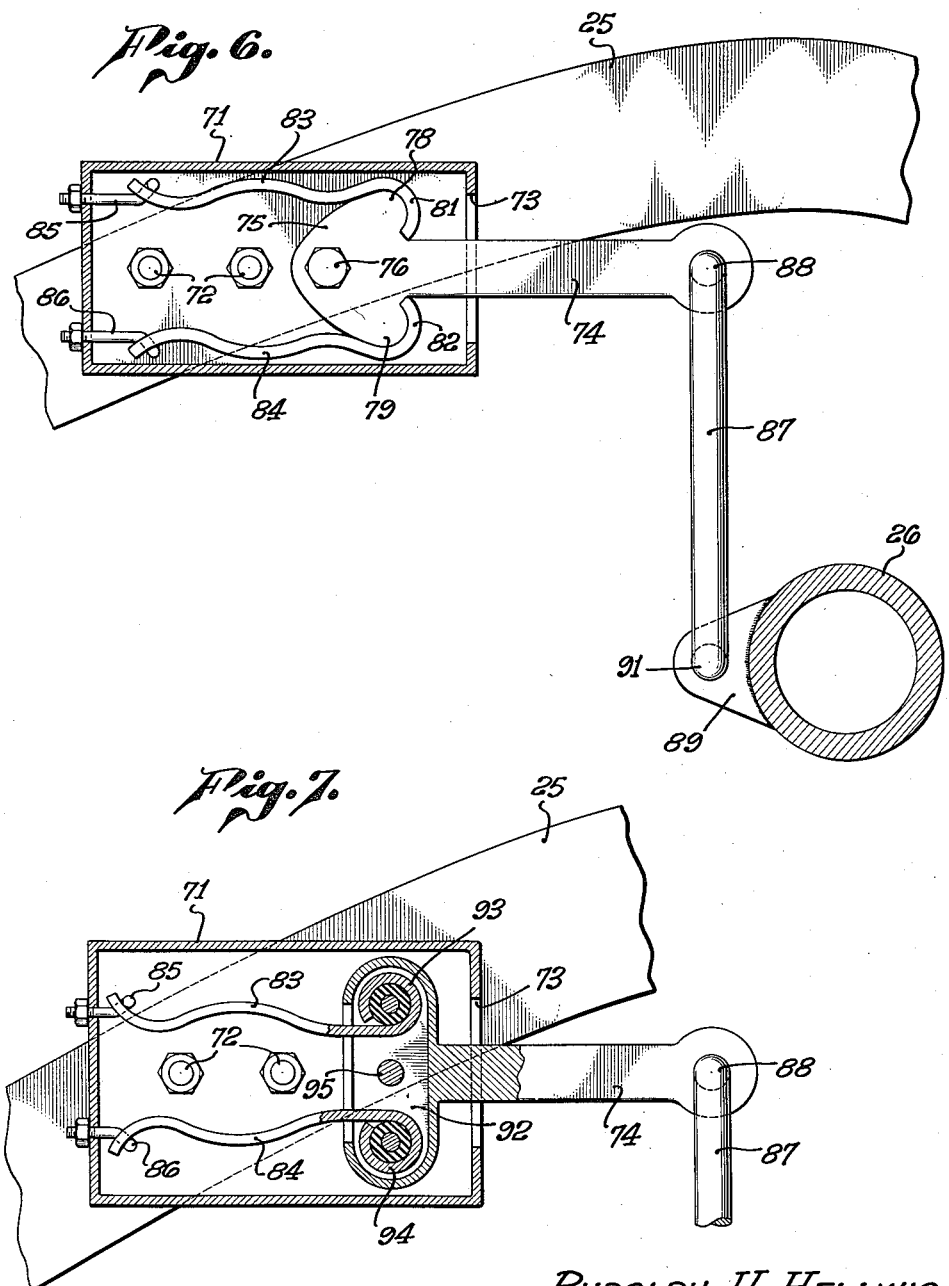

Patented Dec. 18, 1951

2,578,702

UNITED STATES PATENT OFFICE 2,578,702

SPRING STABILIZER ATTACHMENT

Rudolph H. Hellwig, Glendale, Calif.

Application March 15, 1948, Serial No. 15,021

3 Claims. (Cl. 267—16)

This invention relates generally to spring suspension means. More particularly, but not necessarily, the present invention relates to spring suspension means employed in supporting the body of a vehicle on the axle of the car.

It is well known that the use of springs, particularly those employed with vehicles, weaken after usage, and even with a slight amount of loss in resiliency of a vehicle spring, the car will sag forward, backward or to one side. However imperceptible the loss of resiliency of a spring may be, it will cause a car to sway, swerve, bounce and vibrate, ride hard, steer hard, as well as weave on the road. The loss of resiliency of vehicle springs due to usage is responsible for a large number of out-of-control accidents.

Furthermore, it is often necessary to substitute overload springs for the conventional springs supplied with a vehicle for certain usages, such as station wagons, pick-ups, trucks, ambulances, taxi cabs, school and passenger busses, farm trucks, commercial vehicles and especially emergency vehicles, as well as additional load imposed on the springs of a touring car when required to tow a trailer.

Many emergency vehicles, such as police cars and ambulances, are subject to severe usage, and special provision must be made to keep such vehicles in an upright position when traveling at high speed on curves or when the wheels on one side are subjected to terrific road shock, such as occurs when a wheel hits a curb, an obstacle, a hole, etc. The present invention contemplates an assembly which is readily attached to an automobile, does not use coil springs, is of low weight, employs spring elements made of substantially flat strip steel, and is not bulky. The assembly absorbs and distributes road shock effectively and stabilizes a vehicle without impairing its riding comfort. It is, therefore, a primary object of this invention to provide a spring suspension means that may be used instead of the conventional springs or which may be used to strengthen the resiliency of weakened springs due to usage, as well as increase the resiliency of new springs where overload springs are required.

Another object is to provide a spring suspension means that may be used separately as an auxiliary suspension spring.

Another object is to provide spring suspension means for adjusting the resiliency of a spring to prevent weak springs from going below the normal level.

A further object is to provide spring means that may be utilized as a shock absorber to overbuoyant springs so as to provide a soft, resilient suspension that will assure perfect control of a vehicle on which it is installed.

A still further object is to provide spring means which may be employed both as a tension spring for supporting the body of an automobile upon the axle thereof and which may also act as a shock absorber during the rebound of the spring action.

The above and other objects will be made apparent throughout the further description of the invention when taken in connection with the accompanying drawings, wherein like reference characters refer to like parts. It is to be distinctly understood that the drawings are not a definition of the invention but merely illustrate certain forms by means of which the invention may be effectuated.

In the drawings:

Fig. 1 is a front elevational view of a spring suspension means embodying the invention applied to the A frames of a front knee action mounting of a vehicle.

Fig. 2 is an exploded view of the suspension means illustrated in Fig. 1.

Fig. 3 is a view similar to Fig. 1, positioned on the A frame of a vehicle for use as a shock absorber.

Fig. 6 is still another embodiment of the invention showing the present spring means constructed for use as both a suspension spring and a rebound spring.

Figure 4:
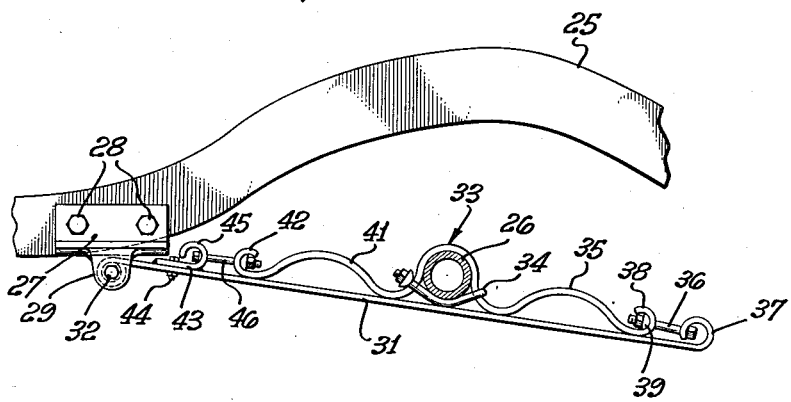
Fig. 4 illustrates another embodiment of the invention showing one form of the present spring suspension means utilized both as a suspension spring and a rebound spring.

Referring to the drawings, Figs. 1 to 3, inclusive, illustrate the present invention utilized in connection with the A frames of a front knee action vehicle mounting. In this embodiment, Fig. 1 illustrates one manner in whch the present invention may be utilized for augmenting the resiliency of the coil springs 10, the latter resting upon the conventional A frames 11. The inner end of each frame 11 is pivotally connected to the vehicle while the outer end is associated with a wheel suspension.

It will be understood that the A frame on each side of the car consists of two outwardly directed bars, with their inner ends spaced apart while the outer ends are relatively close together, thereby presenting a triangular or A configuration in plan view. The present invention may be applied to one bar of each of the A frames for increasing the resiliency of the spring suspension, while the other bar on each side may have the present invention applied thereto for correcting the over-buoyancy of the spring assembly.

In Fig. 1, the invention consists of an expansion or tension bar 12, here shown in the form of an expanded, inverted, U shape, positioned between the ends of the A frame bars 11. It may be noted that although the tension bar 12 is of inverted U shape in general, each of the arms of the bar is preferably somewhat sinusoidal or provided with reversed curve shape to impart greater resiliency thereto and to distribute such resiliency over the entire length of the bar.

It must be pointed out here that the tension bar 12 may assume any desired shape according to the installation on which it is to be installed. In other words, the tension bar 12 may be inverted from that shown in Fig. 1, or it may be of S shape or any other desired shape that will conform to the particular installation being made. The ends 13 and 14 of the tension bar 12 are adjustably connected to connecting bars 15 and 16, respectively. These connecting bars may be made of any suitable material, such as cast steel, spring steel, or the like, while the tension bar 12 is preferably made of spring steel possessed of the required resiliency, depending upon the job being done.

The connecting bars 15 and 16 are clamped to the A frame bars 11 by means of U-shaped clamps 17. These connecting bars may extend the full length of the A frame bar 11 and curve around the outer ends thereof, as shown at 18, it being understood that the bars 15 and 16 may only extend a portion of the length of the A frame bars, as long as the bars 15 and 16 are held rigidly and fixed to any portion of respective A frame.

The means for connecting the ends 13 and 14 of bar 12 with their respective connecting bars 15 and 16 may consist of U-shaped clamps 21 provided with specially designed, semi-cylindrical plates 22, these plates being provided with spaced openings for receiving the legs of the U-shaped clamp 21, one of the plates 22 being inserted on the clamp with its curved surfaces positioned toward the inner curved surface of the tension bar.

After the U-shaped clamp is positioned for connecting the adjacent ends of the tension bar and connecting bar, the other plate 22 is imposed on the legs of the U-shaped clamp 21, the curved surfaces of the other plate 22 resting against the inner concave surface of the curved end of the connecting bar. Thereafter, the nuts 23 are tightened on the threaded end portions of the legs of the U-shaped clamp to provide the desired tension in the tension bar 12. It can now be readily understood that by adjusting the nuts 23, the tension in the bar 12 may be regulated. It will be noted that the tension bar 12 lies in a vertical plane with its central portion above the level of the zone of connection with connecting bars 15 and 16 in Fig. 1, whereas the central portion is below the level of the end portions and the points of connection in Fig. 3. The ends of tension bar 12 and of the adjacent connecting bars are not in actual contact, but instead are spaced from each other, the legs of clamps 21 being under tension. Since ends 13 and 14 are permanently curved in opposite directions to the curvature imparted to the ends of the adjacent connecting bars, the connection is flexible but will not be released even when sudden shock loads of high amplitude are imposed upon the assembly.

It will be noted that clamps 21 are adjacent the inner, pivoted ends of the A frames but not in line with such pivotal axes. Connecting bars 15 and 16 act as flexible levers which couple the A frames to the tension bar 12. The sudden jars and road shocks which are received by the wheel of the vehicle on one side are thus transmitted to the other side in a resilient manner, thereby preventing side sway and preventing tipping of the vehicle, insuring stability, even when the vehicle is traveling at high speed around a curve on a rough road. It is under these extreme conditions (encountered daily by police cars, ambulances, etc.), that the arrangement of the present invention reaches its greatest usefulness.

In Fig. 3, the tension bar 12 is shown inverted, and the connecting bars 15 and 16 are positioned on the upper surfaces of the A frame bars 11. In this embodiment, the present spring means is utilized as a shock absorber to regulate and snub the over-buoyancy of the springs. It is important to note that the arrangement of elements in the present invention produces a lateral or lineal expansion of the tension bar 12. In other words, the spring action of the present invention is substantially perpendicular to the direction of the force applied, i. e., tension bar works in a horizontal plane against road shocks in a vertical plane. Since the central portion of tension bar 12 (extending transversely of the vehicle axis) is not fastened to the vehicle, such tension bar (or most of it) may move transversely of the vehicle to absorb or equalize the loads imposed thereon.

Referring to Fig. 4, which illustrates the present invention for use both as an expansion spring and a rebound spring and is shown applied between the frame 25 of a vehicle and its supporting axle 26, a bracket 27 is rigidly attached to the frame 25 by any suitable means, such as bolts 28. The bracket 27 may be provided with a pair of wings 29 carrying a pin, to which the outer end of a flat bar 31 is turnably connected, as shown at 32. The bar 31 extends inwardly from the bracket 27 and a predetermined distance past the axle 26.

A sinusoidal, flat-stock tension bar or spring, represented in its entirety by 33, is formed intermediate its ends to partly surround the axle 26 and is clamped rigidly to the axle by a curved, U-shaped clamp 34. The inner portion 35 of the tension bar 33 has its free end adjustably connected to the inner free end of the bar 31 by means of an adjustable bolt 36, the inner end of the bar 31 being curved, as shown at 37, and the inner end of the tension bar 35 being correspondingly curved, as shown at 38. The threaded end of the bolt 36 may be provided with a semi-cylindrical washer 39 for permitting limited rotation between the curved surface of the washer 39 and the opposing surface of the curved end 38 of the tension bar 35.

The outer portion 41 of the tension bar 33 has its free end curved, as shown at 42, and is adjustably connected to a bracket 43 anchored to the bar 31 by any suitable means, such as a bolt 44. The bracket 43 is curved, as shown at 45, for accommodating an adjusting bolt 46, whereby the tension on the portion 41 of the tension bar may be adjusted in the same manner as the bolt 36 is utilized for adjusting the tension on the portion 35 of the tension bar 33.

Upon referring to Fig. 4, it will be noted that as the frame of the car moves downwardly relative to the axle 26, the bar 31 will be carried inwardly in the direction of the axle. In doing this, the portion 35 of the tension bar 33 will be sprung. The portion 35 of the tension bar 33 will thereby act as a lift or suspension spring. As the frame 25 moves upwardly from its normal position, the bar 31 will be drawn rearwardly relative to the axle 26, and the portion 41 of the spring 33 will tend to absorb the rebound of the upward movement. Expressed differently, the arrangement shown in Fig. 4 comprises a relatively rigid bar 31 pivotally connected at one end to the frame of the vehicle, such bar carrying a sinusoidal spring 33 connected at its mid-point to an axle and at its ends to the bar, whereby movement of the axle in a vertical direction is translated into a movement of the axle along the bar 31, the ends of the spring 33 absorbing and damping the vertical forces by tensile and compressive effects exerted lineally in a substantially horizontal plane and in directions parallel to the axis of the vehicle and transverse to the axis of the axle.

Figure 5:
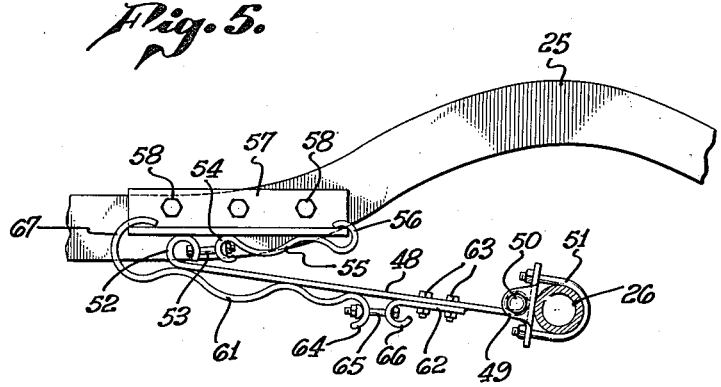
Fig. 5 illustrates another manner in which the present invention may be utilized for the same purpose as that illustrated in Fig. 4.

Fig. 5 illustrates a different construction from that illustrated in Fig. 4, but which will function identically. In this embodiment, the inner end of a bar 48 is pivoted to a bracket 49, as shown at 50, the bracket 49 being rigidly fixed to the axle 26 by means of a U-shaped clamp 51. The outer or free end of the bar 48 is curved at 52 for receiving an adjusting bolt 53, the latter connecting the curved end 52 with the curved end 54 of a tension spring 55, the latter having its inner end curved, as shown at 56, for engaging the inner end of a bracket 57, the latter being rigidly fixed to the frame 25 by any suitable means, such as bolts 58. Another tension spring 61 has its inner end adjustably connected to a bracket 62, the latter being anchored to the bar 48 adjacent the axle 26, as shown at 63. The inner end of the tension spring 61 is curved, as shown at 64, for cooperation with an adjusting bolt 65, the latter being in engagement with the curved portion 66 of the bracket 62. The outer end of the tension bar 61 is curved, as shown at 67, for engagement with the outer end of the bracket 57 carried by the frame 25.

In this embodiment, it can be clearly understood from Fig. 5 that as the frame 25 moves downwardly toward the axle 26, the bar 48 will cause stretching of the tension bar 55, the latter acting as a lift of suspension spring. Upon movement of the frame 25 upwardly from its normal position, stress will be applied to the tension bar 61, the latter acting as a shock absorber to snub any over-buoyancy of the assembly.

Figs. 6 and 7 illustrate the invention utilized as a suspension spring or an auxiliary suspension spring. In this embodiment, housing 71, which is shown in cross-section, is rigidly fixed to a vehicle frame 25 by any suitable means, such as bolts 72. The inner end of the housing is provided with a port 73, through which an arm 74 extends. The inner end of the arm is provided with a heart-shaped head 75, the head 75 being pivotally connected through the housing to the frame 25 by the pivot bolt 76. The head 75 providing the extensions 78 and 79 is formed to engage the curved ends 81 and 82 of tension springs 83 and 84, respectively. The outer ends of the springs 83 and 84 may be anchored to the outer end of the housing by anchor bolts 85 and 86, respectively. The free end of the arm 74 is connected to the axle 26 by any suitable means, such as a rod 87, the upper end of the rod 87 being pivoted to the inner end of the arm 74, as shown at 88, and the lower end of the rod 87 being pivoted to a bracket 89, as shown at 91, the bracket 89 being rigidly fixed to the axle 26.

It will now be understood that when the frame 25 moves downwardly toward the axle 26, the rod 87 will turn the head 75 about its pivot 76, and since the tension bar 84 engages the extension 79 of the head 75, the tension bar will act as a lift or tension spring, and when the body 25 moves upwardly from its normal position relative to the axle, the tension bar 83 engaging extension 78 of the head 75 will act to retard the rebound and serve as a shock absorber.

Fig. 7 illustrates another manner of connecting the tension bars 83 and 84 to the arm 74, which consists in providing a T-shaped head 92, the inner ends of the bars 83 and 84 being connected to the ends of the head 92, as shown at 93 and 94, respectively, the head 92 being pivoted through housing 71 to the frame 25 by the pivot pin 95.

In the embodiment illustrated in Figs. 1 and 3, the present device is applied to the conventional knee action assembly for suspending the front of vehicles. This assembly, which includes an A frame on each side for supporting a vertically disposed coil spring, has a tendency, even when the vehicle is new, to sway from one side to the other during turning curves at relatively high speeds. When the present device is applied to the knee action assembly, as illustrated in Figs. 1 and 3, the lateral resiliency of the tension bar 12 absorbs this swaying action and renders the car free of swerving on the road.

The embodiments illustrated in Figs. 4 and 5 when attached longitudinally of the car, operate to absorb the longitudinal stresses usually imposed on the springs. These particular embodiments are specially adapted for mounting on the rear end of a vehicle as auxiliary spring suspension means for use in place of overload springs for suspending the rear end of a vehicle.

The combination of the vertical resilient component provided for the conventional spring furnished with the vehicle and the horizontal or lateral component produced by the present construction renders a more stable suspension, and the combined vertical and horizontal, resilient components cooperate in unison to provide smooth, perfectly controlled spring action.

The embodiments illustrated in Figs. 6 and 7 illustrate a very simple manner in which the present invention may be utilized for spring suspending one object upon another or the device may be employed as an auxiliary spring to augment conventional springs after they have become weak during usage. This embodiment further provides a shock-absorbing action, thereby providing a compact, self-contained spring suspension and shock absorber within a single unit.

Accordingly there is provided spring suspension means wherein the resiliency of the springs acts substantially perpendicular to the weight of the load imposed thereon. The lateral resilient component of the present invention when used with vertical coil springs operates effectively to eliminate swerving and swaying of a vehicle. The present invention when applied longitudinally of a vehicle operates effectively to absorb the backward and forward longitudinal thrust developed during quick stopping or starting of a vehicle.

The present invention may be utilized as the sole spring suspension means or employed to strengthen conventional suspension means or may be used as an auxiliary spring suspension means. The device is simple, durable, rugged, easy to install, efficient in operation and comparatively cheap to manufacture.

While I have illustrated and described certain forms of the invention, it will now be apparent to those skilled in the art that the tension bars disclosed may assume any desired shape, that the tension bars may be made from material of any selected cross-section, and that the tension bars may be connected in any suitable manner between the supporting object and the object to be supported. Other changes, modifications, substitutions, additions and omissions may be made in the exemplary forms shown without departing from the spirit and scope of the invention as defined by the appended claims.

I claim:

1. In a vehicle having a pair of laterally aligned wheel suspension means, each consisting of a substantially horizontally disposed A-frame having its apex supported by a wheel and its base pivotally mounted upon the vehicle and vertically disposed spring means intermediate said apex and base for springingly supporting the weight borne by the wheel, the provision of: a laterally extending stabilizer attachment consisting of a resilient strip metal member having portions curved about axes transverse to said resilient member, the ends of the resilient member being vertically displaced from said points of pivotal mounting, and means attachable to each end of said resilient member for connecting the member to one of the wheel suspension means whereby vertical movement of a wheel suspension means will cause flexing of said curved portions.

2. A stabilizer attachment as stated in claim 1, wherein said connecting means include means for adjusting the normal length of said resilient strip metal member.

3. In a vehicle having a pair of laterally aligned wheel suspension means, each consisting of a substantially horizontally disposed A-frame having its apex supported by a wheel and its base pivotally mounted upon the vehicle and vertically disposed spring means intermediate said apex and base for springingly supporting the weight borne by the wheel, the provision of: a laterally extending stabilizer attachment consisting of a resilient strip metal member having portions curved about axes transverse to said resilient member, the ends of the resilient member being vertically displaced from said points of pivotal mounting, and means attachable to each end of said resilient member for connecting the member to one of the wheel suspension means, said connecting means including a pair of connecting strips of resilient metal and detachable retaining means for holding a portion of each of said connecting strips fixed relative to an A-frame, whereby vertical movement of a wheel suspension means will cause flexing of said curved portions.

RUDOLPH H. HELLWIG.

REFERENCES CITED

The following references are of record in the file of this patent:

| Number | Name | Date |
| --- | --- | --- |
| 1,859,105 | Munro | May 17, 1932 |
| 2,357,299 | Bagnall | Sept. 5, 1944 |